Jan. 7, 1941.　　　J. G. GUTTMANN　　　2,228,053

REMOVABLE HANDLE FOR FILE OR OTHER IMPLEMENT

Filed March 5, 1938

Inventor
JOSEPH G. GUTTMANN
By Chas. C. Reif
Attorney

Patented Jan. 7, 1941

2,228,053

UNITED STATES PATENT OFFICE 2,228,053

REMOVABLE HANDLE FOR FILE OR OTHER IMPLEMENT

Joseph G. Guttmann, St. Paul, Minn.

Application March 5, 1938, Serial No. 194,097

6 Claims. (Cl. 279—9)

This invention relates to a handle such as used on a file, screwdriver or other implement having a shank portion and particularly to such a handle which is readily removable from said shank portion. In using such implements, particularly files, it is often desirable to change the file for different operations. It is desirable therefore, to have a handle in which different files may be inserted and by means of which they can be securely held for operation. It is also desirable to have such a handle which is simple in construction, convenient and comfortable for use and which can be very quickly changed from one implement to another.

It is an object of this invention therefore, to provide a removable handle of simple and efficient construction which can be very easily and quickly removed from one implement and placed upon another.

It is a further object of the invention to provide a removable handle for a file or other implement having a shank portion comprising sections swingable relatively to each other and having clamping means for engaging and clamping the shank of an implement when said members are brought to closed position together with means for holding said members in closed position.

It is more specifically an object of the invention to provide a handle comprising oppositely disposed portions forming complemental parts of a handle, said portions having yielding clamping means therein separable to receive the shank of an implement therebetween when said portions are swung to open position and arranged to clamp said shank when said portions are swung to closed position and means for holding said portions in closed position.

These and other objects and advantages of the invention will be fully set forth in the following description made in connection with the accompanying drawing in which like reference characters refer to similar parts throughout the several views and in which.

Figure 1:
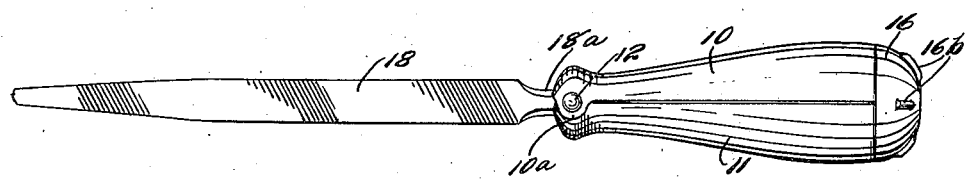
Fig. 1 is a view in side elevation of the handle forming the present invention with a file therein.
Figure 8:
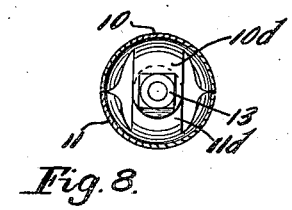
Fig. 8 is a vertical section taken on line 8—8 of Fig. 2 as indicated by the arrows.
Figure 2:
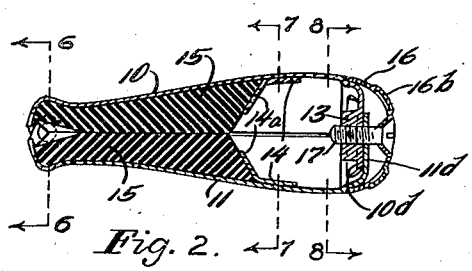
Fig. 2 is a central vertical section taken through the handle shown in Fig. 1.

Referring to the drawing a handle structure is shown comprising oppositely disposed casings 10 and 11. Casings 10 and 11 are each of substantially semi-cylindrical form or of trough-shape and each has projecting inwardly adjacent their smaller or inner ends at each side thereof lugs 10a and 11a. The lugs 10a and 11a are arranged in overlapping engagement and there is thus a pair of these overlapping lugs at each side of members 10 and 11. Said pairs of overlapping lugs are each hingedly connected together by rivets 12, said rivets thus forming the hinge pintles. Members 10 and 11 are each provided with a recess 10b and 11b respectively at their inner ends, these recesses being oppositely disposed and thus cooperating to form a substantially circular opening at the inner end of said members. Member 10 is offset adjacent its free end to form a short ledge 10c and is then bent substantially at a right angle toward member 11 to form an end portion 10d, said portion having substantially parallel sides and a semi-circular end as shown in Fig. 8. A nut 13 is secured to the inner side of portion 10d in any suitable manner as by welding. The member 11 is also offset adjacent its free end to form a short ledge 11c and is then bent at right angle toward member 10 to form the end portion 11d, which portion also has parallel sides and a semi-circular end as shown in Fig. 8. Portion 11d is provided with an aperture 11e adapted to align with the threaded bore in nut 13 when members 10 and 11 are in closed position as shown in Figs. 1 and 2. Plate brackets 14 are secured to the inner sides of member 10 and 11 in any suitable manner as by welding and the same have inwardly extending portions or flanges 14a. Clamping means which as illustrated, comprise blocks 15 of rubber or rubber composition, are disposed and secured in members 10 and 11 between flanges 14a and the inner ends of said members. It will be noted that the inner surfaces of blocks 15 are disposed substantially in the planes of the longitudinal edges of members 10 and 11. A cap member 16 is provided which is generally of semi-spherical form and has a central counter-sunk portion 16a. Said cap also is provided with a plurality of radially extending and circumferentially spaced ribs 16b illustrated as being pressed outwardly from the material of cap 16. A screw 17 has a slotted head fitting in the counter-sunk portion 16a and said screw is preferably rigidly secured in cap 16 as by welding or soldering. Preferably the head of screw 17 is covered with a thin layer of wax, paint, metal or other material. The diameter of cap 16 is such as to fit over the ledges 10c and 11c when members 10 and 11 are in closed position so that the outer surface of said cap extends substantially flush with the adjacent surfaces of members 10 and 11.

Figure 3:
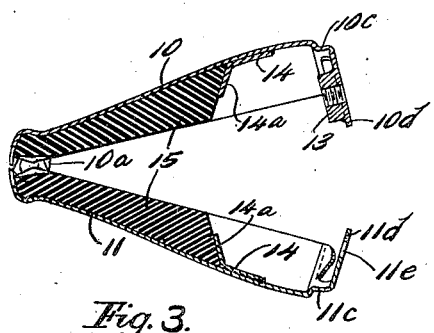
Fig. 3 is a view similar to Fig. 2 showing the end of the handle removed and the parts in separated position.
Figure 4:
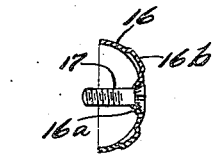
Fig. 4 is a central vertical section through the cap member used.
Figure 5:
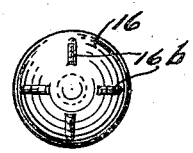
Fig. 5 is a view in end elevation of the handle as seen from the right of Fig. 1.
Figure 6:
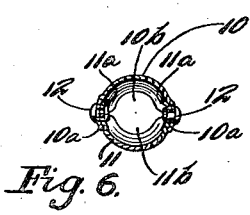
Fig. 6 is a vertical section taken on line 6—6 of Fig. 2 as indicated by the arrows.
Figure 7:
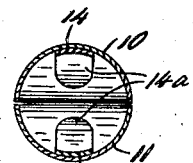
Fig. 7 is a vertical section taken on line 7—7 of Fig. 2 as indicated by the arrows.

When a file or other implement is to be held in said handle, cap 16 will be removed and portions 10 and 11 will be swung apart as shown in Fig. 3. The shank of the file or other implement, which shank is usually of angular shape in cross section, is inserted through the opening formed by the recesses 10b and 11b and is disposed between the blocks 15. The shank will thus extend along the longitudinal center lines of said blocks. The members 10 and 11 are now swung together and the shank of the implement such as the shank 18a of the file 18 shown in Fig. 1, will be very tightly clamped between blocks 15. Blocks 15 will yield somewhat to surround the said shank. With the portions 10 and 11 in closed position the cap is now brought into position with screw 17 axially aligned with opening 11e. Screw 17 is then passed through opening 11e and screwed into the nut 13. The screw is turned until cap 16 engages the shoulders of ledges 10c and 11c and the handle is then in closed position as shown in Figs. 1 and 2. It will be obvious that to again open the handle or remove the tool that cap 16 and screw 17 will be removed by turning cap 16 so that parts 10 and 11 can again be separated. The file 18 or other implement is very securely held in the handle and can be operated as it were rigidly and permanently secured to the handle.

From the above description it will be seen that I have produced a very simple and efficient removable handle by means of which various files or other implements can be held. It is easy to change from one implement to the other and this can be done very quickly. The handle is of very convenient and comfortable form and the ribs 16b on the end thereof will assist in gripping the same, and in turning cap 16 to remove the cap. The handle is preferably nicely finished or coated on its exterior. The structure is very rugged and can be easily and inexpensively made. The device has been amply demonstrated in actual practice and found to be very successful and efficient.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:—

1. A shank comprising a pair of oppositely disposed members shaped to form complemental parts of a substantially cylindrical handle for receiving a tool, a hinge connecting the ends of said members adapted to receive said tool, yielding clamping means carried in each of said members adapted to be brought into clamping position when said members are in closed position, means for holding said members in closed position and a cap engaging the opposite ends of said members and forming the end of said handle.

2. A handle for a file or other article having a shank comprising a pair of oppositely disposed casings adapted to form complemental sides of a handle, a hinge connecting said casings together adjacent the ends thereof adapted to receive said file, said members having registering slots therein forming an opening centrally through the inner end thereof, yielding means carried in said casings adjacent the inner ends thereof adapted to be brought into clamping position when said members are brought together, said members having overlapping portions at their outer ends and means passing through said portions for holding said members together to clamp the shank of a file or other article extending through said opening and between said yielding means.

3. The structure set forth in claim 2 and a substantially semi-spherical cap engaging the outer ends of said members and forming the end of said handle.

4. The structure set forth in claim 2, said last mentioned means comprising a screw threaded into one of said portions and a cap engaging the ends of said casings to which said screw is secured.

5. A handle for a file or other article having a shank comprising a pair of oppositely disposed casings substantially semi-cylindrical in form, a hinge connecting said casings adjacent their inner ends, yielding members disposed in said casings adapted to be separated when said casings are swung apart and to be brought into close proximity to clamp said shank therebetween when said casings are in closed position, means for holding said means in closed position and a substantially semi-spherical cap adapted to fit over the other ends of said casings and be substantially flush therewith.

6. A handle for a file or other article having a shank comprising a pair of oppositely disposed casings substantially semi-cylindrical in form, a hinge connecting said casings adjacent their inner ends, yielding members disposed in said casings adapted to be separated when said casings are swung apart and to be brought into close proximity to clamp said shank therebetween when said casings are in closed position, a substantially semi-spherical cap adapted to fit over the other ends of said casings and be substantially flush therewith and means carried by said cap engaging said casings for holding the same in closed position.

JOSEPH G. GUTTMANN.